R. B. THOMPSON.
TRIMMING MECHANISM FOR SEWING MACHINES.
APPLICATION FILED MAY 18, 1909.

1,136,846.

Patented Apr. 20, 1915.
5 SHEETS—SHEET 1.

Fig. 1.

Witnesses

Inventor
Reuben B. Thompson
By Sturtevant & Mason
Attorneys

R. B. THOMPSON.
TRIMMING MECHANISM FOR SEWING MACHINES.
APPLICATION FILED MAY 18, 1909.

1,136,846.

Patented Apr. 20, 1915.
5 SHEETS—SHEET 3.

Witnesses
C. H. Walker
Albert Popluna

Inventor
Reuben B. Thompson
By Sturtevant & Mason
Attorneys

R. B. THOMPSON.
TRIMMING MECHANISM FOR SEWING MACHINES.
APPLICATION FILED MAY 18, 1909.

1,136,846.

Patented Apr. 20, 1915.
5 SHEETS—SHEET 4.

Witnesses
C. H. Walker
Albert Ophuma

Inventor
Reuben B. Thompson
By Sturtevant & Mason
Attorneys

R. B. THOMPSON.
TRIMMING MECHANISM FOR SEWING MACHINES.
APPLICATION FILED MAY 18, 1909.

1,136,846.

Patented Apr. 20, 1915.
5 SHEETS—SHEET 5.

Witnesses
C. H. Walker
Albert Popkins

Inventor
Reuben B. Thompson
By Sturtevant & Mason
Attorneys

UNITED STATES PATENT OFFICE.

REUBEN B. THOMPSON, OF COHOES, NEW YORK, ASSIGNOR TO UNION SPECIAL MACHINE COMPANY, OF CHICAGO, ILLINOIS, A CORPORATION OF ILLINOIS.

TRIMMING MECHANISM FOR SEWING-MACHINES.

1,136,846.      Specification of Letters Patent.      Patented Apr. 20, 1915.

Application filed May 18, 1909. Serial No. 496,859.

*To all whom it may concern:*

Be it known that I, REUBEN B. THOMPSON, a citizen of the United States, residing at Cohoes, in the county of Albany, State of New York, have invented certain new and useful Improvements in Trimming Mechanism for Sewing-Machines, of which the following is a description, reference being had to the accompanying drawing, and to the letters and figures of reference marked thereon.

The invention relates to new and useful improvements in trimming mechanisms, and more especially to trimming mechanisms which are used in connection with sewing machines, although it is obvious from certain aspects of the invention, the trimming mechanism hereinafter described and claimed may be used independently of the stitch forming mechanism.

An object of the invention is to provide a trimming mechanism with means for controlling the effective action of the trimming mechanism whereby said trimming mechanism may at the will of the operator, be rendered effective or ineffective.

A further object of the invention is to provide a trimming mechanism of the above character which is so related to the stitch forming mechanism that one or more only of a plurality of superposed layers of fabric may be cut or trimmed, one of the cut edges being deflected away from the stitching mechanism, while the other will be carried flat and unstretched to the stitching mechanism, so that the said cut edge may be covered by cross stitching.

A further object of the invention is to provide a trimming mechanism which shall be durable in construction, compact as to parts and efficient in its operation.

A further object of the invention is to provide a trimming mechanism which is located beneath the work support and has an overhanging cutting blade projecting above the work support with means for adjusting the support for the overhanging cutting member, whereby the distance said member projects above the work support, may be adjusted.

These and other objects will in part be obvious and will in part be hereinafter more fully described.

In the drawings which show by way of illustration one embodiment of the invention; Fig. 2 is a top plan view of the forward end of the machine with the work support removed, showing the parts underneath the work support. Fig. 2ª is a section through the trimmer support.

As herein shown, my trimming mechanism is applied to a sewing machine which is of the ordinary construction and consists of a bed plate 1, having an overhanging arm 2, on which is pivoted a needle lever 3, which is oscillated by means of a link 4 from an eccentric on the main shaft 5. The lever 3 is connected by a suitable link, with the needle bar 6, which reciprocates in the forward end of the overhanging arm.

The needle bar 6, as herein shown is provided with two needles, 7 and 8. The thread clamp and the thread guides herein shown for controlling the needle threads are of the usual construction and will not need to be described.

The bed plate 1 is provided with a long lug 9, and a post 10 on which rests the cloth plate 11 of the machine. The feed dog 12 is carried by a feed bar 13 pivoted to the usual feed rocker 14 which is mounted in suitable bearings at the rear of the machine. Said feed rocker 14 carries a rigid arm 15 which is pivotally secured to a link 16 mounted on an eccentrically-located crank 17 which is adjustably carried by a slotted disk 18 on the forward end of the main shaft 5. This eccentric pin will give a rocking movement to the feed rocker and will in turn move the feed dog back and forth.

Figure 5:
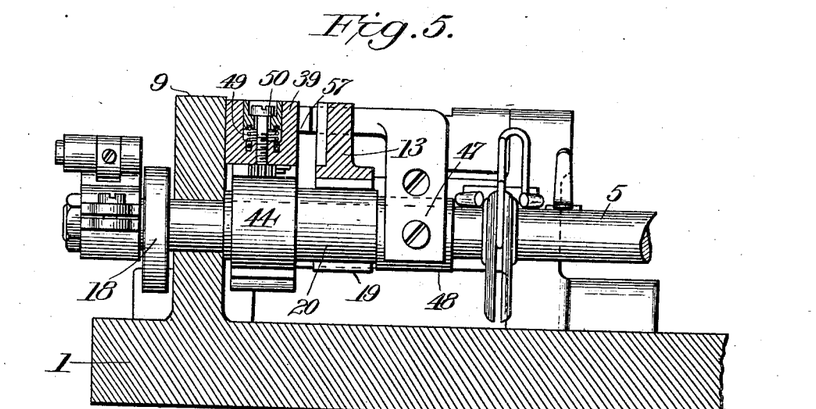
Fig. 5 is a longitudinal section through the front end of the machine, taken on the line of the driving shaft.

The feed dog is given its rising and falling movements by means of a yoke or forked arm 19, which engages a cam 20 mounted on the main shaft 5 (see Fig. 5).

A looper 21 is pivoted to a looper rocker 22, which is oscillated by means of the arm 23 which engages an eccentric or cam on the main shaft 5. The looper is vibrated into and out of the needle loop by the link 24, which is pivoted to the lower end of the needle lever 3.

Figure 11:
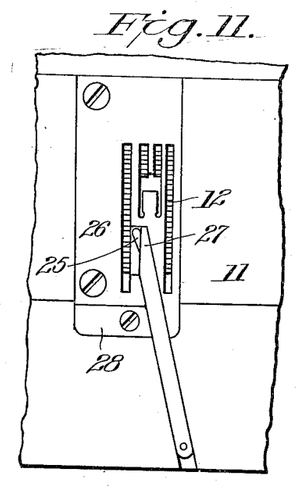
Fig. 11 is a top plan view showing the throat plate and the members of the trimming mechanism.
Figure 14:
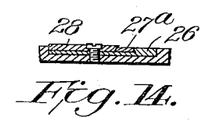
Fig. 14 is a section taken on the line *x—x* of Fig. 13.

My improved trimming mechanism comprises a movable trimming member 25, and said trimming member is so disposed as to project up through the throat plate 26 carried by the cloth plate 11 of the machine, (see Fig. 11). This trimming member 25 is pointed at its forward end and is provided with a rounded upper face. Coöperating with the trimming member 25 is a stationary trimming member 27 which as herein shown, is arranged at an angle to the line of feed, and has its coöperating cutting end ground so as to form a cutting edge lying substantially in the line of feed. This trimming member 27 is mounted in a dove-tail groove in the work support and throat plate, and is held in proper relation to the cutting member 25 by means of a clamping finger 28 (see Figs. 11 and 14).

Figure 12:
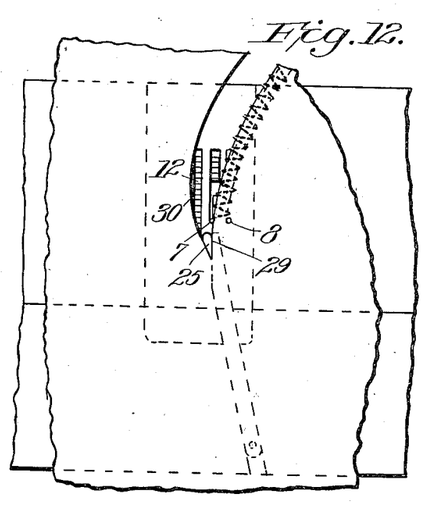
Fig. 12 is a similar view showing only the lower layer of the material and the manner of deflecting one of the cut edges away from the stitching mechanism.

The trimming members 25 and 27 are located in advance of the stitching mechanism (see Figs. 11 and 12). In Fig. 12 the needles are indicated by 7 and 8. The right hand face of the trimming member 25 is directly in front of the needle 7, so that the cut edge 29 will pass alongside of the needle 7 between the needles 7 and 8, without being bent, deflected or distorted in any way. The other cut edge 30 will be deflected to one side by the shank of the trimming member 25.

Figure 13:
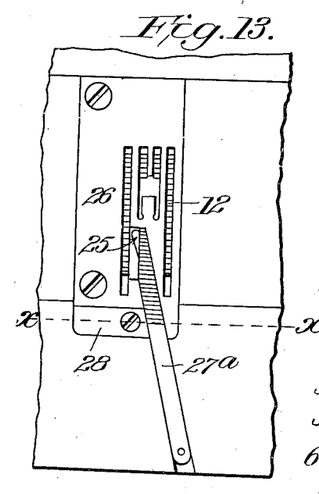
Fig. 13 is a view similar to Fig. 11 showing a modified form of the stationary trimming member.
Figure 15:
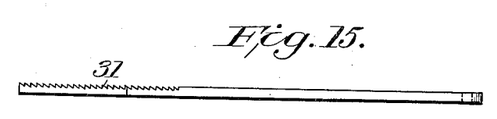
Fig. 15 is a side view of the stationary trimming blade.
Figure 16:
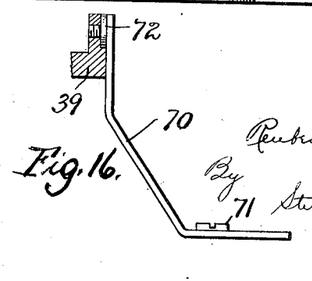
Fig. 16 is a detail of the guiding bracket.

In Figs. 13 and 15, I have shown a slightly modified form of stationary trimming member in that the trimming member 27ᵃ, is provided with teeth 31 on its upper face, which project toward the rear of the machine, and will operate to hold the material from slipping forward when the movable trimmer blade operates to shear the fabric.

The trimming blade 25 has a laterally deflected shank 32 which is mounted in a recess 33 in the forward end of a trimmer supporting bar 35. A screw 36 is threaded into the side face of the bar 35 and serves as an abutment for the shank of the trimming blade 25. A suitable screw 37 will hold the trimming blade on the supporting bar. The supporting bar 35 is pivoted at 38 to a frame 39, which in turn is pivoted at 40 to a link 41. The link 41 is pivoted to a lug 42 by the pivot pin 43.

Figures 6, 7, 8, 9:
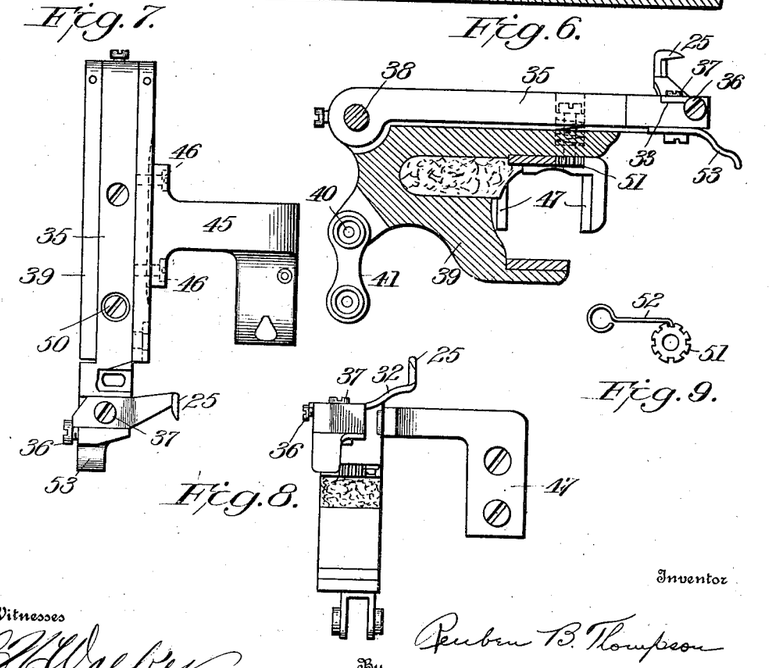
Fig. 6 is a sectional view through the trimmer supporting mechanism.
Fig. 7 is a plan view of the trimmer supporting and operating mechanism removed from the machine.
Fig. 8 is an end view of the same.
Fig. 9 is a detail showing the manner of holding the nut when adjusting the trimmer support.
Figure 10:
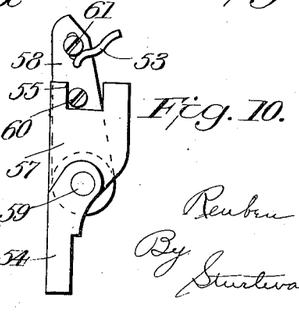
Fig. 10 is a detail view showing the end of the lever for controlling the position of the trimmer support and the coöperating stops.

The frame 39 is moved up and down on its pivotal support 40 by means of a cam 44 mounted on the main shaft 5. This cam engages suitable bearing plates mounted in the frame 39. The frame 39 is moved bodily back and forth by means of a bracket arm 45 which is secured to the side face of the frame by suitable screws 46, shown in dotted lines, Fig. 7.

The bracket arm 45 is forked as at 47 (see Figs. 5, 6 and 8) and the arms of said fork embrace a cam 48 on the main shaft 5. It will thus be seen that I have provided the main shaft with three cams which are located side by side and the two outer cams operate to give the swinging frame 39 its movements back and forth and up and down, while the intermediate cam operates to move the feed dog up and down.

It will also be seen that by my present arrangement, I can locate the swinging frame between the feed bar and the elongated supporting lug 9 for the cloth plate. The frame 39 is cut away centrally at its upper face to receive the supporting bar 35 for the trimming member.

A spring 49 is located between the supporting bar 35 and the bottom of the recess in the frame 39, said bar and frame being grooved to receive the ends of said spring. A threaded bolt 50 passes down through the bar 35 and the frame 39. Said bar is bored out so as to house the upper end of the threaded bolt 50. At the lower end, said threaded bolt engages a nut 51 which is provided with spaced grooves on its outer face. A locking dog 52 engages one of the grooves in the nut 51 and serves to hold the same from rotating. If therefore, the bolt 50 be turned, it will be threaded into or out of the nut 51 and the position of the supporting bar 35 for the trimming member 25, varied relative to the frame 39. In other words, the threaded bolt 50 determines the extreme upper position of the bar 35, relative to the frame 39, as the spring 49 normally operates to hold said bar 35 in contact with the head of the bolt 50.

By the mechanism above described, it will be seen that the trimming member 25 will be moved back and forth and up and down through the action of the cams 44 and 48. It will also be seen that by adjusting the bolt 50, the path of movement of the cutting member 25 relative to the work support, may be varied. When one only of two superposed layers of fabric is to be cut, the path of movement of the trimming member is so adjusted that the point of the trimming member will penetrate between the two superposed layers, separating said layers and raising the upper layer so that it will pass over the top of the movable trimming member.

The downward stroke of the cutter is sufficient to sever the lower layer of the material. If desired, two layers might be cut and a third layer lifted so as to pass over the top of the trimming member. Then again, if a folded edge is fed to the trimming mechanism, the sharp penetrating point of the cutting blade 25 on its forward stroke, will penetrate said folded edge and pass between the layers so as to separate the two layers of material and cut the lower layer.

As a means for rendering the cutting mechanism ineffective when desirable at the will of the operator, I have provided the trimmer supporting bar 35 with an outwardly and downwardly projecting arm 53. A bracket 54 is secured to the bed plate 1, and has an upwardly projecting standard which is slotted at its upper end as at 55, so as to form two stops 56 and 57.

A lever 58 is pivoted to the standard mounted on the bracket 54 by means of a fulcrum screw 59. Said lever carries a stud 60 which rests in the slot 55 and will engage either the stop 56 or the stop 57, depending upon which way said lever 58 may be thrown.

At the upper end of the lever 58 is a stud 61 which is carried by a screw adjustably secured to the lever through the slot connection 62. The stud 61 is so disposed that when the stud 60 is in contact with the stop 56, said stud 61 will engage the arm 53 and move the supporting bar 35 downward into the recess in the frame 39, compressing the spring 49 underneath the supporting bar 35. This downward movement of the bar 35 withdraws the cutting member 25 a sufficient distance beneath the work support so that the penetrating point of said member will not engage the fabric passing through the machine. In other words, the path of movement of the penetrating point is below the plane of movement of the lower face of the lower layer of fabric. This stud 62 does not however, prevent the continued movements of the trimming member 25, but merely renders said movements ineffective upon the fabric.

When the lever 58 is moved in the opposite direction, the stud 60 engages the stop 57 and then the stud 61 is out of the path of movement of the arm 53. I have shown the lever 58 as provided with an extended arm 63 having a suitable eye 64 with which a treadle may be connected if desired. A spring 65 is secured at one end to the lever 58 and at the other end to a pin 66 on the supporting lug 9 of the machine.

Figure 1:
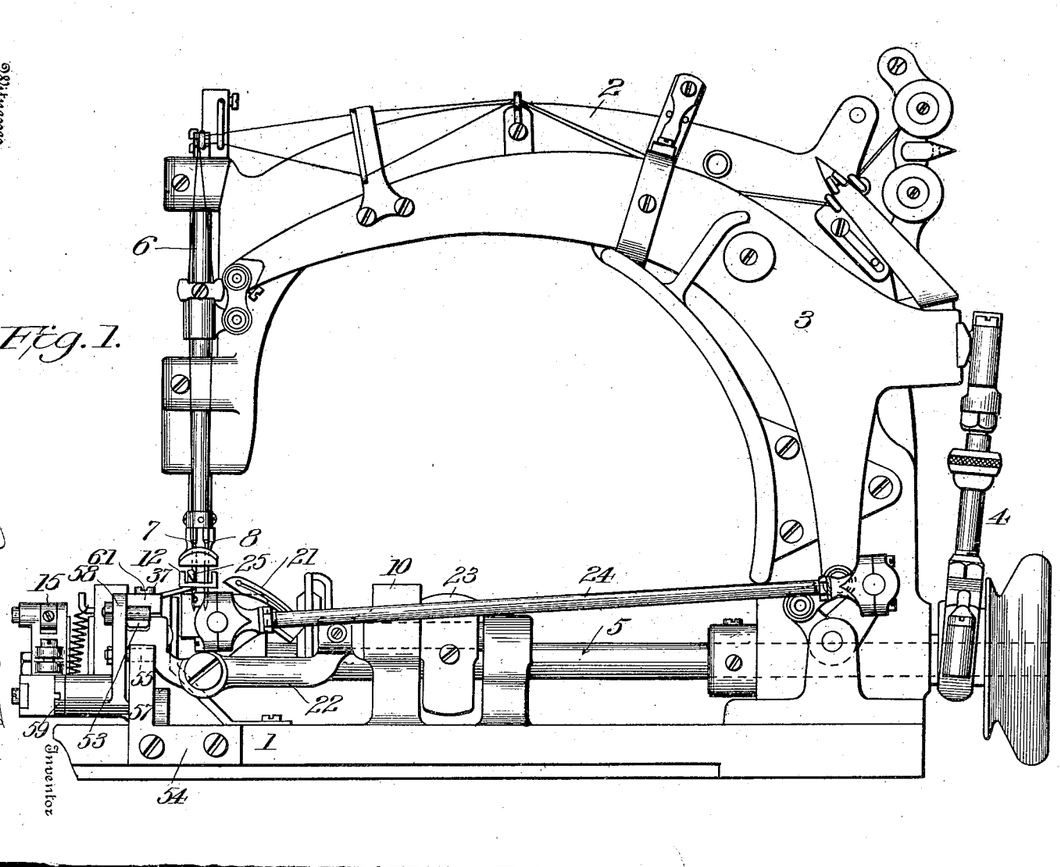
Figure 1 is a front view of the machine with the work support removed and showing my trimming mechanism applied thereto.
Figures 2, 2A:
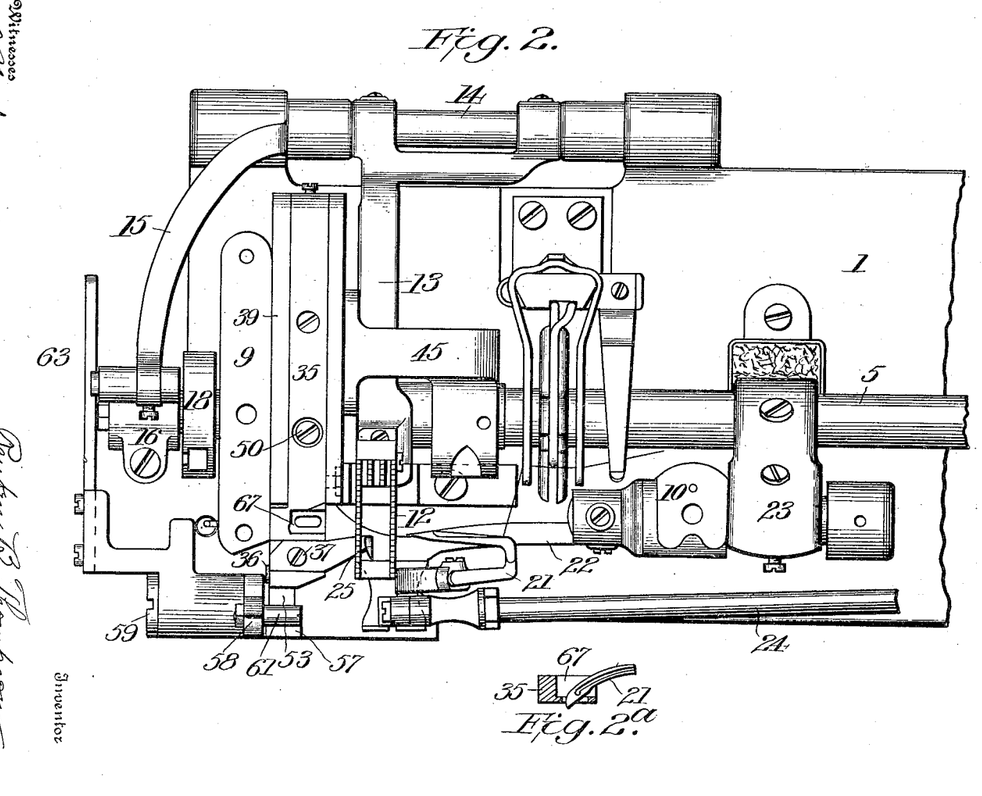
Figure 3:
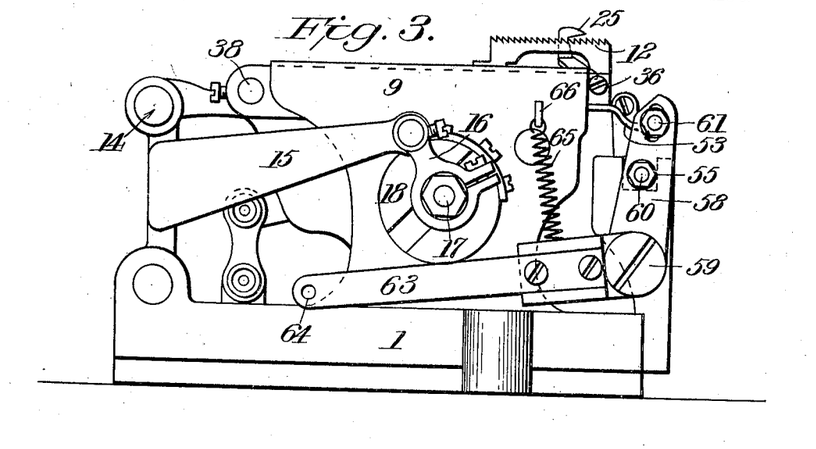
Fig. 3 is an end view of the parts shown in Fig. 2.
Figure 4:
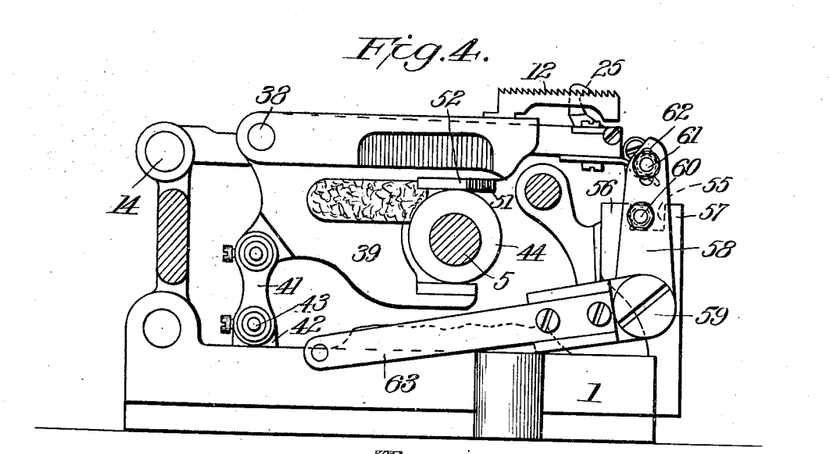
Fig. 4 is a section through the machine, showing the trimmer operating mechanism in side view.

The trimmer support 35 is cut away as at 67 (see Fig. 2ᵃ) so as to form a clearance space for the end of the looper 21.

Inasmuch as the fork coöperating with the cam 44, for raising and lowering the trimmer support is at right angles to the fork coöperating with the cam 48 for moving the support back and forth, it is evident that the support may move simultaneously back and forth and up and down, so as to move the trimmer in the curved path desired.

The trimmer support is located adjacent the lug 9 and will be guided on one side by said lug as it moves back and forth. As a means for guiding the other side of the trimmer support, I have provided a bracket 70 which is secured to the bed plate by a suitable screw 71 and at its upper end is located adjacent the trimmer support 39.

The trimmer support may be recessed and provided with a hardened bearing surface 72 if desired.

Having thus particularly described my invention, what I claim as new and desire to secure by Letters Patent is:—

1. The combination with a work support, and mechanism for making a cross stitch, of a trimming mechanism including a movable member for severing the fabric, said severing member having a shank projecting through the work support and located entirely at one side of the cut edge which is to be covered by the stitches, and having its cutting edge only, substantially in the vertical plane of one edge of the cross-stitching.

2. The combination with mechanism for making a cross stitch including spaced needles, of a trimming mechanism including a movable member for severing the fabric, said severing member having its body portion located entirely at one side of the cut edge which is to be covered by the stitches, and having its cutting edge only, substantially in line with one of the needles of the cross-stitching, said severing member being shaped and supported to separate superposed layers of fabric and sever one of them.

3. The combination with mechanism for making a cross stitch including spaced needles, of a trimming mechanism including a movable member for severing the fabric, said severing member having its body portion located entirely at one side of the cut edge which is to be covered by the stitches, and having its cutting edge only, substantially in line with one of said needles of the cross-stitching, said body portion being arranged to deflect the cut-off strip beyond the plane of the cut edge and out of the path of the needles.

4. The combination with a work support, and cross stitching mechanism, of a trimming mechanism, including a movable supporting member, a cutting blade carried thereby and having a laterally projecting cutting portion, the cutting face of said portion being located on the side adjacent the cross stitching mechanism.

5. The combination with a two needle stitching mechanism, of a trimming mechanism including a support, a cutting blade carried by said support, means for operating said support, said cutting blade having a laterally projecting portion adapted to separate two superposed layers of fabric and cut one of said layers, said cutting blade being located in advance of the stitching mechanism and substantially in front of one of the needles, the cutting face of said blade being on the side adjacent the stitching mechanism.

6. The combination with a work support, and stitch forming mechanism including two spaced needles, of a trimming mechanism including a movable support mounted beneath the work support, a trimming blade carried by said movable support and projecting above the work support, said trimming blade having a laterally projecting cutting portion and a penetrating point, a stationary trimming blade coöperating with said movable cutting blade, and means for supporting said stationary cutting blade at the side of the movable cutting blade, adjacent the stitch forming mechanism.

7. A trimming mechanism including in combination a work support, a shaft, a supporting frame, a trimmer blade carried by said supporting frame, means for pivotally supporting the rear end of said supporting frame, eccentrically disposed members carried by said shaft, and means rigidly connected to said frame and coöperating directly with said eccentrically arranged members for positively moving said frame back and forth and up and down.

8. A trimming mechanism including in combination a work support, a supporting frame mounted beneath said work support, a trimming blade carried by said supporting frame and movable relative thereto in the plane of the frame, yielding means for moving said trimming blade in one direction relative to said frame, devices for limiting the movement of said trimming blade relative to said frame, and means for operating said supporting frame for actuating said trimming blade.

9. A trimming mechanism including a work support, a supporting frame mounted beneath said work support, a trimming blade, means for supporting said trimming blade on said frame, means for yieldingly forcing said trimming blade away from said frame, means for limiting the movement of said trimming blade, and means for operating said frame.

10. A trimming mechanism including in combination, a work support, a supporting frame mounted beneath said work support, a trimming blade, a supporting bar carrying said trimming blade, means for pivoting said bar to said frame, means whereby the position of said bar relative to said frame may be adjusted, said adjusting means including a yielding member for moving the supporting bar in one direction, and means for operating said frame.

11. A trimming mechanism including a work support, a supporting frame, having a recess in its upper face, a bar pivotally supported in said recess, a trimming member carried by said bar, means for adjusting said bar in said recess about its pivotal connection, and means for operating said supporting frame.

12. A trimming mechanism including in combination a work support, a supporting frame, having a recess formed in its upper face, a supporting bar pivoted in said recess at one end of said bar, a supporting blade carried by the other end of said bar, a spring interposed between said bar and said supporting frame, an adjustable screw for limiting the movement of said bar by said spring, and means for operating said supporting frame.

13. A trimming mechanism including in combination a work support, an operating shaft, a supporting frame, a link on which the supporting frame is pivoted, a trimming blade carried by said supporting frame, a bracket attached to said supporting frame, an eccentric member mounted on said operating shaft and engaging said bracket for positively moving said supporting frame back and forth, a second eccentric member mounted on said operating shaft, and devices fixed to said frame and coöperating with said second eccentric member for positively raising and lowering the supporting frame on its supporting link.

14. A trimmer mechanism including in combination, a work support, a supporting frame, a trimming blade carried thereby, a link pivoted at one end to the machine frame, and at its other end to said supporting frame, a main shaft, a cam carried by said main shaft, means carried by said supporting frame and coöperating with said cam, whereby said frame is raised and lowered, a bracket arm carried by said frame, a second cam carried by said shaft, and coöperating with said bracket arm, whereby said frame is positively moved back and forth.

15. A trimming mechanism including in combination, a supporting frame, a link connected to one end of said supporting frame, and at its other end pivotally connected to the machine frame, a main shaft, a cam carried by said main shaft, means carried by said supporting frame, and coöperating with said cam whereby said supporting frame is raised and lowered, a bracket arm carried by said supporting frame, a second cam carried by said main shaft and coöperating with said bracket arm, whereby said supporting frame is moved back and forth, a trimmer blade, a supporting bar for said trimmer blade, and means for adjustably connecting said supporting bar to said supporting frame.

16. A trimming mechanism including in combination, a supporting frame, a link connected to one end of said supporting frame, and at its other end pivotally-connected to the machine frame, a main shaft, a cam carried by said main shaft, means carried by said supporting frame, and coöperating with said cam whereby said supporting frame is raised and lowered, a bracket arm carried by said supporting frame, a second cam carried by said main shaft and coöperating with said bracket arm, whereby said supporting arm is moved back and forth, a trimmer blade, a supporting bar carrying said trimmer blade, means for pivotally connecting said supporting bar to said supporting frame, and means for adjusting said supporting bar about its pivotal connection, relative to said supporting frame.

17. A trimming mechanism including in combination, a supporting frame, a link connected to one end of said supporting frame, and at its other end pivotally connected to the machine frame, a main shaft, a cam carried by said main shaft, means carried by said supporting frame, and coöperating with said cam whereby said supporting frame is raised and lowered, a bracket arm carried by said supporting frame, a second cam carried by said main shaft and coöperating with said bracket arm, whereby said supporting frame is moved back and forth, a trimmer blade, a supporting bar, said supporting frame having a recess in its upper face to receive said supporting bar, a spring interposed between said bar and said frame, and means for limiting the movement of said bar relative to said frame, caused by said spring.

18. A trimming mechanism including in combination, a supporting frame, a trimming blade, means for positively moving said supporting frame up and down, means for connecting said trimming blade to said supporting frame, whereby said supporting blade is positively moved downwardly with said supporting frame, means for yieldingly carrying said trimmer blade upwardly with said frame, and means under the control of the operator, operable while the machine is in operation, for preventing the upward movement of said trimming blade with said supporting frame.

19. A trimming mechanism including in combination a work support, a supporting frame beneath the work support, means for raising and lowering said supporting frame, a supporting bar connected to said supporting frame and movable vertically independently thereof, a trimming blade carried by said supporting bar and projecting above and overhanging the work support, said overhanging portion of the trimming blade having a cutting edge formed thereon, and means whereby the operator may at will adjust the position of said supporting bar relative to the supporting frame without stopping the movements of said frame for rendering the cutting action of the trimming blade effective or ineffective.

20. A trimming mechanism including in combination, a supporting frame, means for operating said supporting frame, a trimmer blade, a supporting bar carrying said trimmer blade, means for pivotally connecting said bar to said supporting frame, a spring interposed between said supporting bar and said frame, means for limiting the upward movement of said bar caused by said spring, and means under the control of the operator, operable while the machine is in operation, for depressing said supporting bar, whereby the cutting blade is rendered ineffective.

21. A trimming mechanism including in combination, a supporting frame, means for operating said supporting frame, a trimmer blade, a supporting bar for said trimming blade, means for adjustably connecting said supporting bar to said supporting frame, an arm projecting from said supporting bar, a normally stationary lever, a projecting member carried by said lever and adapted upon the swinging of said lever to engage said arm and adjust the position of the supporting bar relative to the supporting frame.

22. A trimming mechanism including in combination a supporting frame, means for operating said supporting frame, a trimmer blade, a supporting bar for said trimming blade, means for adjustably connecting said supporting bar to said supporting frame, an arm projecting from said supporting bar, a normally stationary lever, a projecting member carried by said lever and adapted upon the swinging of said lever, to engage said arm and adjust the position of the supporting bar relative to the supporting frame, and stops for limiting the movement of said lever.

23. A trimming mechanism including in combination a supporting frame, means for operating said supporting frame, a trimmer blade, a supporting bar for said trimming blade, means for adjustably connecting said supporting bar to said supporting frame, an arm projecting from said supporting bar, a normally stationary lever, a projecting member carried by said lever and adapted upon the swinging of said lever to engage said arm and adjust the position of the supporting bar relative to the supporting frame, and means whereby the position of said projecting member may be adjusted relative to said lever.

24. A trimming mechanism including in combination, a supporting frame, means for operating said supporting frame, a trimming blade, a supporting bar for said trimming blade, means for connecting said supporting bar to said supporting frame, whereby it is yieldingly pressed outward away from said supporting frame, means for limiting the outward movement of said bar, an arm carried by said bar, a normally stationary lever, an adjustable stud carried by said lever and adapted to engage said arm and depress said supporting arm when the lever is shifted in one direction, and a spring for normally moving said lever out of contact with said arm.

25. A trimming mechanism including in combination, a supporting frame, means for operating said supporting frame, a trimming blade, a supporting bar for said trimming blade, means for connecting said supporting bar to said supporting frame whereby it is yieldingly pressed outward away from said supporting frame, means for limiting the outward movement of said bar, an arm carried by said bar, a normally stationary lever, an adjustable stud carried by said lever, and adapted to engage said arm and depress said supporting arm, when the lever is shifted in one direction, a spring for normally moving said lever out of contact with said arm, a standard, stops formed in said standard, and a second stud carried by said lever and adapted to engage said stops for limiting the movement of said lever.

26. The combination of a work support, a stitch forming mechanism, a feeding mechanism, and a trimming mechanism, said trimming mechanism including a stationary trimming blade, disposed in the plane of the work support and located wholly in advance of the stitch forming mechanism and having its cutting edge in line with one of the stitch forming elements, said work support having a recess formed in its upper face for receiving said stationary blade, and means for holding the blade in said recess, said means permitting said blade to be adjusted longitudinally in said recess.

27. The combination of a work support, a stitch forming mechanism, a feeding mechanism and a trimming mechanism, said trimming mechanism including a stationary trimmer blade, disposed in the plane of the work support and located in advance of the stitch forming mechanism, and having its cutting edge in line with one of the stitch forming elements, said stationary trimmer having a shank portion arranged at an acute angle to the line of feed, and a cutting face substantially parallel to the line of feed, said work support being recessed to receive said stationary trimmer blade, and means for adjustably holding said trimmer blade in said recess.

28. A trimming mechanism including in combination, a movable trimming blade, a stationary trimmer blade, means for moving said movable trimmer blade back and forth and up and down, said stationary trimmer blade coöperating therewith and having its upper face formed with teeth projecting in a direction away from the direction of movement of the movable trimming blade during its cutting action.

29. The combination with cross stitch mechanism including two spaced needles, a trimming mechanism including a movable member having means for separating two superposed layers of fabric and for severing one of the layers, said member having its body portion located entirely at one side of the outer needle, and its cutting edge only substantially in the vertical plane of said needle.

30. A trimming mechanism including in combination a work support, a trimming member located beneath the work support, and projecting above and overhanging said work support, a support for said trimming member, means for holding said trimming member on said support, and an adjustable screw carried by said support for positioning said trimming member relative to said support, and for varying the position of said overhanging trimmer relative to the work support.

31. A trimming mechanism including in combination a work support, a trimming blade mounted beneath the work support and projecting above and overhanging said work support, said trimming blade having a piercing point and a cutting edge on its lower face in rear thereof, a supporting frame, means for moving said supporting frame, a support for the cutting blade, means carried by said supporting frame for holding said support for the cutting blade whereby said support for the cutting blade is movable only in the plane of the supporting frame, and means for adjusting said support for the cutting blade on said frame whereby the piercing point of the cutting blade may be shifted relative to said supporting frame.

32. A trimming mechanism comprising in combination a trimmer, a support therefor, means for reciprocating said support in one direction including a cam and a coöperating fork carried by said support, means for reciprocating said support in a direction substantially at right angles to the first direction, including a cam and a coöperating fork carried by the support located at right angles to the first named fork.

33. The combination of a bed plate, a supporting lug thereon, a cloth plate carried at one end by said lug, a trimming mechanism including a trimming member, a support therefor, means for vibrating said support, said support being located so as to be guided by said lug on one side and a bracket carried by said bed plate and guiding the other side of said support.

34. In a trimming mechanism including a work support, a trimming blade, a support therefor, means to normally hold said trimming blade spring pressed upwardly relative to its support, and means to limit the upward movement of said trimming blade and means under the control of the operator for rendering said trimming blade ineffective.

In testimony whereof I affix my signature, in presence of two witnesses.

REUBEN B. THOMPSON.

Witnesses:
EARL L. WHITE,
A. K. DIXON, Jr.

Copies of this patent may be obtained for five cents each, by addressing the "Commissioner of Patents. Washington, D. C."